United States Patent [19]
Song et al.

[11] Patent Number: 5,748,172
[45] Date of Patent: May 5, 1998

[54] MIRROR DRIVING METHOD AND APPARATUS OF MICRO-MIRROR ARRAY

[75] Inventors: Ci-moo Song, Sungnam; Chul-woo Lee, Seoul; Han-ki Cho, Suwon, all of Rep. of Korea

[73] Assignee: Samsung Electro-Mechanics Co., Ltd., Suwon, Rep. of Korea

[21] Appl. No.: 591,785

[22] Filed: Jan. 25, 1996

[30] Foreign Application Priority Data

Feb. 25, 1995 [KR] Rep. of Korea ............... 95-3760

[51] Int. Cl.⁶ ............................................. G09G 3/34
[52] U.S. Cl. ................................... 345/111; 345/85
[58] Field of Search ...................... 345/7–9, 86–87, 345/90, 84, 85, 108, 111

[56] References Cited

U.S. PATENT DOCUMENTS

| | | | |
|---|---|---|---|
| 3,916,403 | 10/1975 | Mandzsu et al. | 345/84 |
| 4,281,898 | 8/1981 | Ochiai et al. | 350/281 |
| 4,318,098 | 3/1982 | McGreevy | 340/764 |
| 4,566,935 | 1/1986 | Hornbeck | 156/624 |
| 4,662,746 | 5/1987 | Hornbeck | 350/269 |
| 5,083,857 | 1/1992 | Hornbeck | 359/291 |
| 5,126,836 | 6/1992 | Um | 358/60 |
| 5,150,205 | 9/1992 | Um et al. | 358/60 |
| 5,153,573 | 10/1992 | Spletter | 345/87 |
| 5,185,660 | 2/1993 | Um | 358/60 |

Primary Examiner—Richard Hjerpe
Assistant Examiner—Vui T. Tran
Attorney, Agent, or Firm—Burns, Doane, Swecker & Mathis, L.L.P.

[57] ABSTRACT

In a mirror driving method of a micro-mirror array and an apparatus thereof, each of a plurality of mirrors is pivotally supported by hinges fixed to a substrate, and a permanent magnet is attached beneath the substrate to form a magnetic field about the mirrors. A coiled conductive layer is formed on the rear surface of each mirror to be selectively applied with current according to a video signal, and the selected mirror pivots in correspondence with the electrostatic force operative between the conductive layer to which the current is applied and the magnetic field. Thus, a light beam irradiating the micro-mirror array can be modulated according to an image, and mass production is made possible due to a simple structure which provides for a stable driving action.

21 Claims, 4 Drawing Sheets

MIRROR DRIVING METHOD AND APPARATUS OF MICRO-MIRROR ARRAY

BACKGROUND OF THE INVENTION

The present invention relates to a method for driving a mirror of a micro-mirror array and an apparatus thereof, and more particularly, to a mirror driving method in which a mirror is driven by an electromagnetic force, and to an apparatus thereof.

A micro-mirror array is constructed with a plurality of micro-mirrors which are arrayed on a plane (substrate) so as to be selectively rotatable. The micro-mirror array can be used as a deflector for deflecting light, as a modulator for modulating light in accordance with a light signal or a two-dimensional video signal, or as a display for displaying an image by converting a light signal into a video signal. Such an array provides superior resolution, brightness and video quality and enables the manufacture of smaller, thinner and lighter devices than can be achieved with the CRTs or LCDs conventionally employed.

In a well-known technology for driving a mirror utilizing a piezoelectric force (see U.S. Pat. Nos. 5,126,836 and 5,185,660), electrodes are situated at either end of each of a plurality of piezoelectric crystals fixed between a reference plane and a micro-mirror array. Such a sophisticated structure, however, impedes mass production and the mechanical force of the piezoelectric crystal is applied directly to the mirrors which are thus easily broken. Further, the contiguous arrangement of the mirrors within one plane is an arduous task in practice.

Meanwhile, according to U.S. Pat. No. 5,083,857, each mirror of an array is supported by a hinge provided on a semiconductor substrate, with electrodes being formed on respective lower surfaces of each mirror. An electrostatic force is established across an air gap between the substrate and the electrodes and causes a selected mirror to pivot on the hinge. Here, though mass production can be achieved by employing conventional techniques used in semiconductor manufacturing, the air gap between mirror and substrate must be extremely narrow so that the electrostatic force is sufficient to move the mirror.

SUMMARY OF THE INVENTION

To solve the above problems, it is an object of the present invention to provide a method for driving a mirror of a micro-mirror array and an apparatus thereof, which can be manufactured in an ultra-small size due to its simple structure, and simultaneously, can be put in mass production and has a stable driving feature.

Accordingly, to achieve the above object, there is provided a mirror driving method of a micro-mirror array provided with a plurality of mirror members each of which is pivotally supported, the method comprising the steps of: applying a magnetic field uniformly throughout to the plurality of mirror members; and selecting a mirror member among the plurality of mirror members according to an image signal and allowing an electrical current to flow through the selected mirror member, wherein the selected mirror member is pivoted by means of an electromagnetic force between the applied magnetic field and electrical current so as to deflect incident light.

To achieve another aspect of the above object, there is provided a mirror driving apparatus of a micro-mirror array provided with a plurality of mirror members each of which is pivotally supported, the apparatus comprising: magnetic-field-forming means for applying a magnetic field to the plurality of mirror members; and conductive means for allowing an electric current to flow through each of the plurality of mirror members in order to generate magnetic flux lines linked with the magnetic field, wherein each mirror member is pivoted by an electromagnetic force between the magnetic-field-forming means and conductive means.

Therefore, the present invention solves the problems in a conventional technology using a piezoelectric or electrostatic force and provides for a micro-mirror array exhibiting driving stability which can be applied in mass production.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
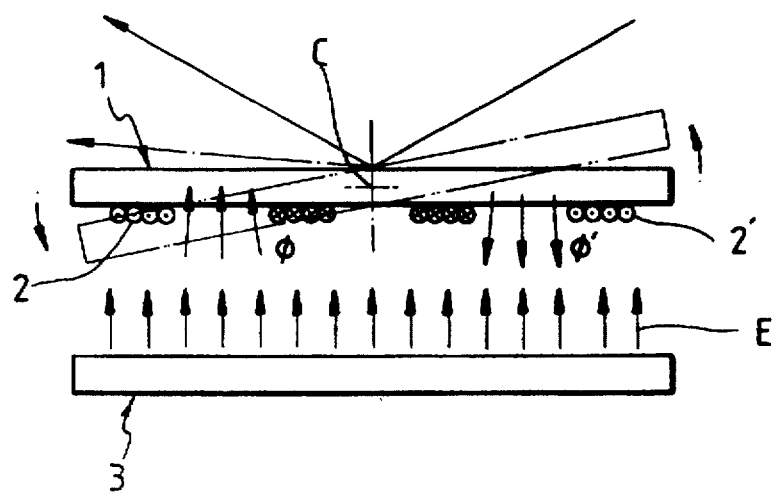
FIG. 1 is a functional profile view for explaining the principle of a mirror driving method of a micro-mirror array according to the present invention.

As shown in FIG. 1, a mirror member 1 for reflecting light incident to a surface thereof can be pivoted about its center "C" by hinge means in a seesaw-like manner. Electrical current is supplied to mirror member 1A by means of coils 2 and 2' attached on either side of the rear surface of mirror member 1. A permanent magnet 3 for producing a magnetic field "E" is arranged opposite coils 2 and 2'.

When current is applied to each of coils 2 and 2' in opposite directions, such that the magnetic flux lines $\phi$ and $\phi'$ formed by the respective coils oppose each other, opposing electromagnetic forces are generated on each side of "C" with respect to the static flux field formed by permanent magnet 3. Thus, mirror member 1 is pivoted about its center and light incident to the surface is deflected. Here, the positions of coils 2 and 2' and permanent magnet 3 may be interchanged such that the magnet is attached to the mirror and the coils formed on the substrate, and a permanent magnet 3 may be substituted with an electromagnet.

Besides simply deflecting the light as above, the mirror driving method of the present invention, may be applied to a modulator for modulating the current flowing in coils 2 and 2' into a desired light signal by rapidly switching the current on and off.

Figure 2:
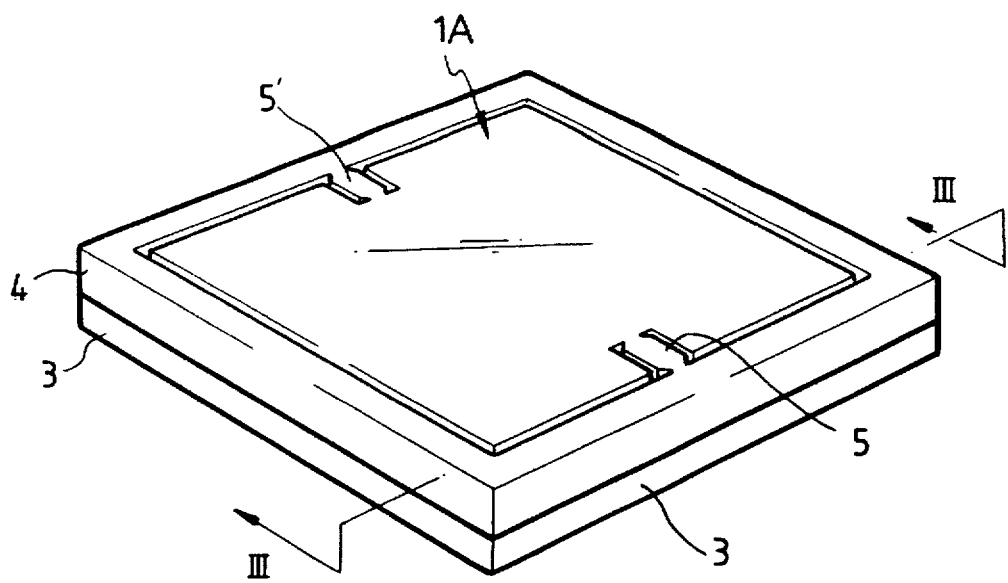
FIG. 2 is a perspective view of a micro-mirror device unit for explaining the mirror driving apparatus of a micro-mirror array according to the present invention.
Figure 3:
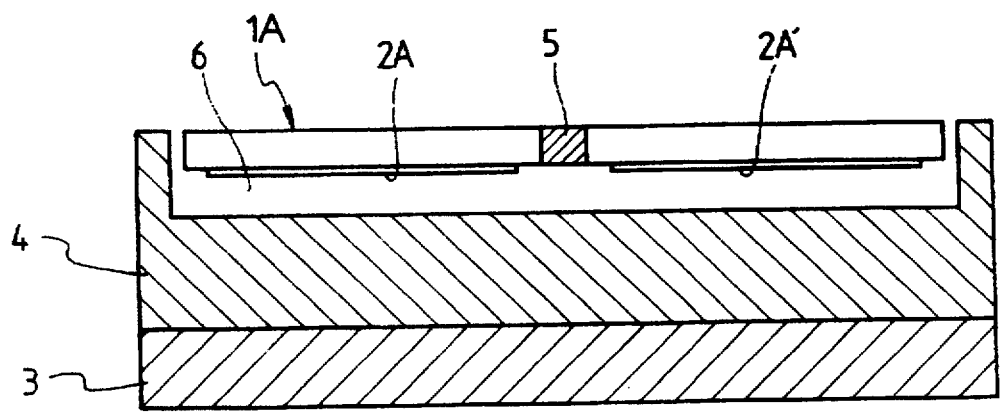
FIG. 3 is a cross-section along line III—III illustrating the micro-mirror device of FIG. 2.

FIGS. 2 and 3 show a micro-mirror device as a specific embodiment of the mirror driving apparatus of the present invention. The micro-mirror device comprises a substrate 4, a mirror member 1A formed on substrate 4, a permanent magnet 3 attached beneath substrate 4, and coiled conductive patterns 2A and 2A' formed on the rear surface of mirror member 1A. Mirror member 1A is formed by dividing the surface of substrate 4 aside from hinges 5 and 5' at each central portion of the side portions opposing each other. Accordingly, the mirror member 1A can be pivoted about hinges 5 and 5' in a seesaw-like manner. Substrate 4 is provided with a cavity 6 (FIG. 3) for accommodating the pivoting movement of mirror member 1A. Permanent magnet 3 has a magnetic pole (N or S) for forming a magnetic field with respect to the whole surface of mirror member 1A.

Figure 4:
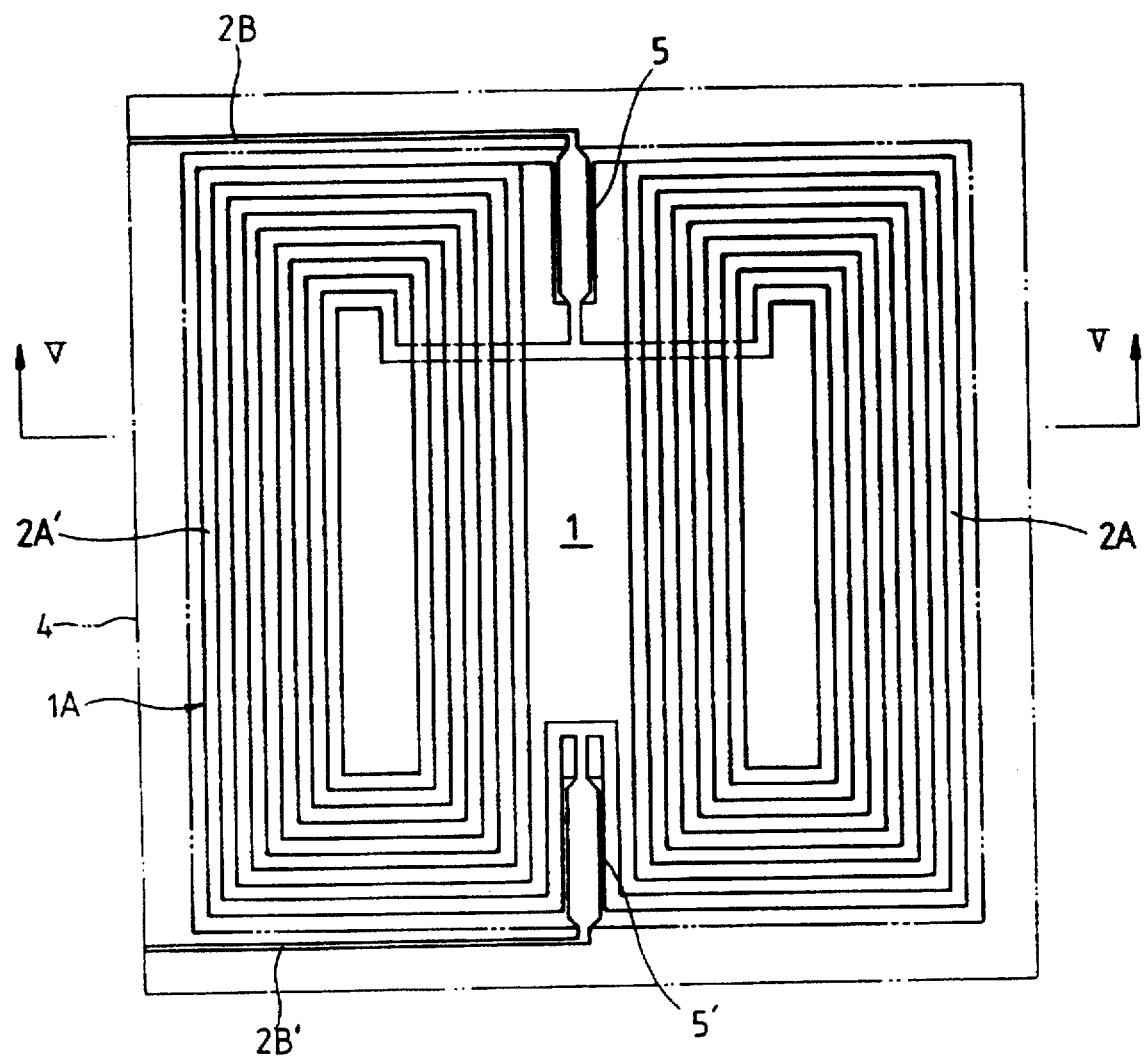
FIG. 4 is a plan view illustrating the rear surface of the micro-mirror device shown in FIG. 2.
Figure 5:
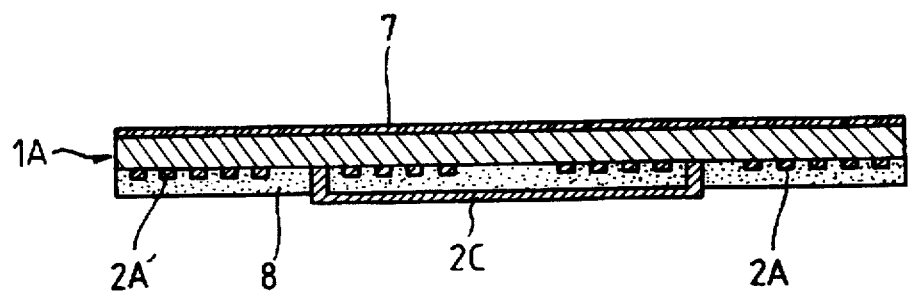
FIG. 5 is a cross-section along the line V—V illustrating the micro-mirror device of FIG. 4.

Referring to FIG. 4, coiled conductive patterns 2A and 2A' are formed by coating the rear surface of mirror member 1A with an electrically conductive material such as metal and patterning the same into a predetermined coil shape and are connected with lead patterns 2B and 2B' which provide external wiring along both hinges 5 and 5' for applying current. In the meantime, as shown in FIG. 5, a reflection film 7 for reflecting light is formed on one surface of mirror member 1A, and on the other surface thereof, an insulating layer 8 is formed for forming jumper pattern 2C which mutually connects coil conductive patterns 2A and 2A'.

Such a micro-mirror device can be manufactured in a thin ultra-small package using a thin-film processing technology such as a growth method, a metal film coating and etching method. Such a micro-mirror device of an ultra-small type may also be used as an optical signal modulator in an optical pickup for recording/reproducing, which utilizes a second harmonic generation (SHG) light source.

Figure 6:
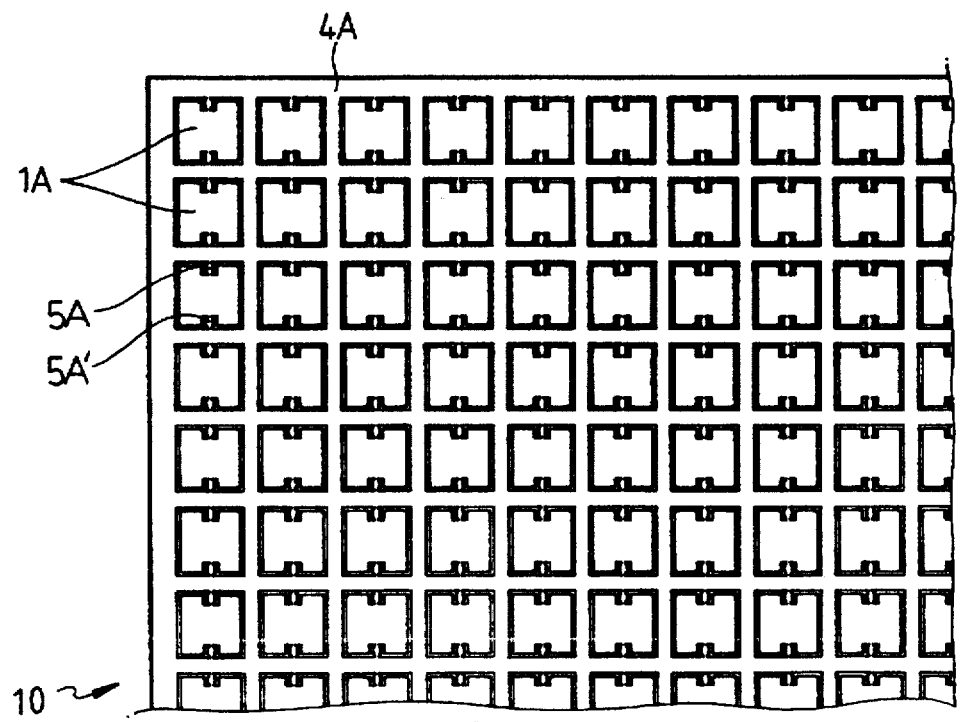
FIG. 6 is a plan view of a micro-mirror array to which the present invention is applied.

FIG. 6 shows a micro-mirror array 10 to which a mirror driving apparatus of the present invention is applied. In micro-mirror array 10, a plurality of mirror members 1A each having hinges 5 and 5' are arrayed on a large common substrate 4A in pixel units. On the rear surface of each mirror member 1A, the above-described coiled conductive pattern is formed, and on the bottom surface of common substrate 4A, the permanent magnet having a large magnetic pole surface enough to form a uniform magnetic field throughout the entire surface of mirror members 1A.

Figure 7:
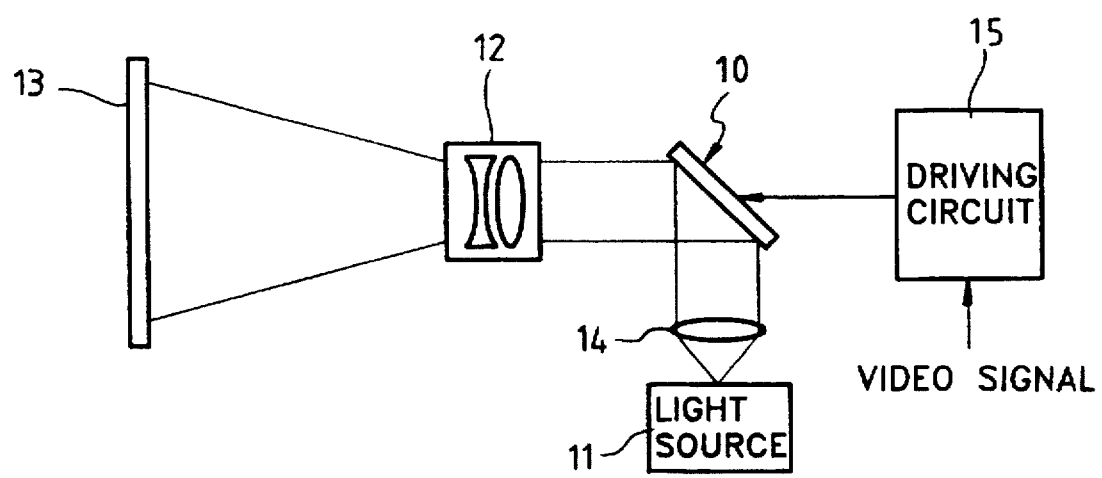
FIG. 7 is a schematic view showing an image projector for magnifying and projecting an image using the micro-mirror array to which the present invention is applied.

FIG. 7 shows an image projecting apparatus using micro-mirror array 10 of FIG. 6 as an image modulator. In the image projecting apparatus, micro-mirror array 10 is arranged between a light source 11 and a focusing lens 12, and connected with a driving circuit 15 for applying current to the coiled conductive pattern of a selected mirror member according to a video signal. Thus, light radiated from light source 11 via a collimating lens 14 is modulated into a two-dimensional image according to the video signal. Then, projecting lens 12 enlarges and projects the light of the image modulated by micro-mirror array 10 onto a large screen 13.

The above micro-mirror array can be used not only for the modulation of an image but also as a display for displaying the image. Further, it can be used as a light adjustor adjusting the intensity of the deflected incident light.

As described above, in driving the mirror member of the micro-mirror array according to the present invention, a new method is provided which uses an electromagnetic force rather the conventional piezoelectric or electrostatic force. Thus, according to the present invention, the structure of the micro-mirror array becomes simple so that manufacturing in an ultra-small size and mass production is possible by utilizing a thin-film processing technology of a semiconductor wafer, as well as curtailing manufacturing cost. Particularly, the present invention contributes to improve reliability of various applied products.

It is noted that the present invention is not limited to the preferred embodiment described above, and it is apparent that variations and modifications by those skilled in the art can be effected within the spirit and scope of the present invention as defined in the appended claims.

What is claimed is:

1. A mirror driving method of a micro-mirror array provided with a plurality of mirror members each of which is pivotally supported, said method comprising the steps of:

(a) applying a magnetic field uniformly throughout to said plurality of mirror members; and (b) selecting a mirror member among said plurality of mirror members according to an image signal and allowing an electrical current to flow through the selected mirror member by applying electric current to conductive means attached to one surface of each mirror member, wherein the selected mirror member is pivoted by means of an electromagnetic force between said applied magnetic field and electrical current so as to deflect incident light.

2. A mirror driving method of a micro-mirror array as claimed in claim 1, wherein said step (a) is performed by arranging a permanent magnet having a magnetic pole surface to form a magnetic field with respect to said plurality of mirror members.

3. A mirror driving method of a micro-mirror array as claimed in claim 1, wherein said step (a) is performed by arranging an electromagnet having a magnetic pole surface to form a magnetic field with respect to said plurality of mirror members.

4. A mirror driving method of a micro-mirror array as claimed in claim 1, wherein said conductive means comprises at least one coil attached to one surface of each mirror member.

5. A mirror driving method of a micro-mirror array as claimed in claim 1, wherein said conductive means comprises a coiled conductive pattern formed on one surface of each mirror member wherein each mirror member is coated with an electrically conductive material patterned into a coil shape.

6. A mirror driving apparatus of a micro-mirror array provided with a plurality of mirror members each of which is pivotally supported, said apparatus comprising:

magnetic-field-forming means for applying a magnetic field to said plurality of mirror members; and conductive means attached to one surface of said mirror for allowing an electric current to flow through each of said plurality of mirror members in order to generate magnetic flux lines linked with the magnetic field, wherein each mirror member is pivoted by an electromagnetic force between said magnetic-field-forming means and conductive means.

7. A mirror driving apparatus of a micro-mirror array as claimed in claim 6, wherein said magnetic-field-forming means comprises a permanent magnet having a magnetic pole surface with respect to said plurality of mirror members.

8. A mirror driving apparatus of a micro-mirror array as claimed in claim 6, wherein said magnetic-field-forming means comprises an electromagnet having a magnetic pole surface with respect to said plurality of mirror members.

9. A mirror driving apparatus of a micro-mirror array as claimed in claim 6, wherein said conductive means comprises at least one coil attached to one surface of each mirror member.

10. A mirror driving apparatus of a micro-mirror array as claimed in claim 6, wherein said conductive means comprises at least one coiled conductive pattern formed on one surface of each mirror member wherein said mirror member is coated with an electrically conductive material patterned into a coil shape.

11. A mirror driving apparatus of a micro-mirror array as claimed in claim 10, wherein said mirror member includes an insulating layer for insulating a jumper pattern over said at least one coiled conductive pattern.

12. A mirror driving apparatus of a micro-mirror array provided with a plurality of mirror members each of which is pivotally supported, said apparatus comprising:

a common substrate;

a plurality of hinges for pivotally supporting said plurality of mirror members on said common substrate, respectively;

a permanent magnet attached beneath said common substrate and having a magnetic pole surface with respect to said plurality of mirror members;

a coiled conductive pattern formed on each one surface of said plurality of mirror members; and means for applying electric current to said coiled conductive pattern of the selected mirror member of said plurality of mirror members according to an image signal.

13. A mirror driving apparatus of a micro-mirror array in claim 12, wherein said coiled conductive pattern is formed on one surface of each mirror member wherein said mirror member is coated with an electrically conductive material patterned into a coil shape.

14. A mirror driving apparatus comprising:

a semiconductor substrate;

a mirror;

a pair of hinges on said substrate for pivotally supporting said mirror;

magnetic field forming means disposed beneath said substrate for applying a magnetic field to said mirror;

conductive means uniformly dispersed throughout one surface of said mirror for allowing an electric current to flow through said mirror in order to generate magnetic flux lines linked with the magnetic field; and wherein said mirror is pivoted by an electromagnetic force between said magnetic field forming means and said conductive means.

15. A mirror driving apparatus as claimed in claim 14, wherein said magnetic field forming means comprises a permanent magnet having a magnetic pole surface with respect to said mirror.

16. A mirror driving apparatus as claimed in claim 14, wherein said magnetic field forming means comprises an electromagnet having a magnetic pole surface with respect to said mirror.

17. A mirror driving apparatus as claimed in claim 14, wherein said conductive means comprises at least one coil attached to one surface of said mirror.

18. A mirror driving apparatus as claimed in claim 14, wherein said conductive means comprises at least one coiled conductive pattern formed on one surface of said mirror wherein said mirror is coated with an electrically conductive material patterned into a coil shape.

19. A mirror driving apparatus as claimed in claim 14, wherein said mirror includes an insulating layer for insulating a jumper pattern over said at least one coiled conductive pattern.

20. A mirror driving apparatus as claimed in claim 14, wherein said mirror comprises a reflective film disposed on said mirror.

21. A mirror driving apparatus as claimed in claim 14, wherein said mirror comprises an insulating layer disposed on said conductive means.

* * * * *